United States Patent
Sawada et al.

(10) Patent No.: US 10,162,673 B2
(45) Date of Patent: Dec. 25, 2018

(54) CONTROLLER PREVENTING COMMUNICATION COLLISIONS BETWEEN PARALLEL CONTROL PROGRAMS

(71) Applicant: OMRON Corporation, Kyoto-shi, Kyoto (JP)

(72) Inventors: Shigenori Sawada, Takatsuki (JP); Taishi Kawaguchi, Kyoto (JP); Yasushi Yamawaki, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/951,581

(22) Filed: Nov. 25, 2015

(65) Prior Publication Data

US 2016/0292004 A1    Oct. 6, 2016

(30) Foreign Application Priority Data

Mar. 31, 2015  (JP) ................. 2015-074630

(51) Int. Cl.
| | |
|---|---|
| *G06F 9/48* | (2006.01) |
| *G06F 9/52* | (2006.01) |
| *G06F 9/54* | (2006.01) |
| *G06F 9/38* | (2018.01) |
| *G06F 13/12* | (2006.01) |

(52) U.S. Cl.
CPC .......... *G06F 9/4881* (2013.01); *G06F 9/3885* (2013.01); *G06F 9/52* (2013.01); *G06F 9/54* (2013.01); *G06F 13/128* (2013.01); *G05B 2219/2205* (2013.01)

(58) Field of Classification Search
CPC .......... G06F 9/5011; G06F 2209/503
See application file for complete search history.

(56) References Cited

U.S. PATENT DOCUMENTS

| | | |
|---|---|---|
| 2002/0064185 A1 | 5/2002 | Nakai et al. |
| 2005/0267953 A1 | 12/2005 | Suzuki et al. |

(Continued)

FOREIGN PATENT DOCUMENTS

| | | |
|---|---|---|
| CN | 103403631 A | 11/2013 |
| CN | 103403684 A | 11/2013 |

(Continued)

OTHER PUBLICATIONS

Roman Obermaisser: "Excerpts from Embedded Systems: Time-Triggered Communication", International Standard Book No. 978-1-4398-4662-9, Oct. 1, 2011, p. 80-83, 361-373, XP055301209, Retrieved from the Internet: URL:http://site.ebrary.com/lib/epo/detail.action?docID=10502489 [retrieved on Sep. 9, 2016] pp. 81, 368-p. 372.

(Continued)

*Primary Examiner* — Sisley N Kim
(74) *Attorney, Agent, or Firm* — Metrolexis Law Group, PLLC

(57) ABSTRACT

A controller enables execution of control programs in parallel using a multi-core processor in shorter cycles without causing communication collisions. The controller executes control programs in multiple cycles. In accordance with the priorities assigned to a control program 1 and a control program 2, the controller controls the timing to execute communication associated with the control program 2 without colliding with communication with external devices associated with the control program 1.

14 Claims, 9 Drawing Sheets

(56) References Cited

U.S. PATENT DOCUMENTS

| | | | |
|---|---|---|---|
| 2006/0287742 A1 | 12/2006 | Khan et al. | |
| 2012/0239172 A1 | 9/2012 | Nishiyama et al. | |
| 2014/0005805 A1* | 1/2014 | Nishiyama | G06F 9/544 |
| | | | 700/74 |
| 2014/0005808 A1* | 1/2014 | Nishiyama | G05B 19/05 |
| | | | 700/86 |
| 2014/0005835 A1 | 1/2014 | Nishiyama et al. | |
| 2014/0012402 A1* | 1/2014 | Nishiyama | G05B 19/05 |
| | | | 700/86 |
| 2016/0077509 A1* | 3/2016 | Graf | G05B 19/056 |
| | | | 700/86 |

FOREIGN PATENT DOCUMENTS

| | | | |
|---|---|---|---|
| CN | 103430109 A | | 12/2013 |
| EP | 2672384 A1 | | 12/2013 |
| JP | 2002-164903 A | | 6/2002 |
| JP | 2010-224939 | * | 3/2009 |
| JP | 2010-224939 A | | 10/2010 |
| JP | 2012-194667 A | | 10/2012 |

OTHER PUBLICATIONS

Japanese office action (JPOA) dated Jun. 5, 2018 in a counterpart Japanese Patent application.

Chinese office action dated Mar. 30, 2018 in a counterpart Chinese Patent application.

\* cited by examiner

FIG. 6

| Unit location | Unit | Control program |
|---|---|---|
| | ▽  Network setting | |
| Master | Master | |
| NODE1 | R88D-KN01H-EC | Control program 1    ▽ |
| NODE2 | R88D-KN01H-EC | Control program 1    ▽ |
| NODE3 | R88D-KN01H-EC | Control program 1    ▽ |
| NODE4 | R88D-KN01H-EC | Control program 2    ▽ |
| NODE5 | R88D-KN01H-EC | Control program 2    ▽ |

CONTROLLER PREVENTING COMMUNICATION COLLISIONS BETWEEN PARALLEL CONTROL PROGRAMS

FIELD

The present invention relates to a controller for controlling the operations of machines or devices, and more particularly, to a controller for controlling communication with devices connected to a network.

BACKGROUND

A controller transmits output data to an input-output (IO) unit, which outputs signals to devices such as a relay or an actuator connected to the controller via a network. The controller also receives input data from external devices. The controller performs computation using the input data to obtain output data. The controller repeats this series of operations to control machines or devices.

The controller may be connected to one of a plurality of field networks, which are used particularly in the control industry in which real-time response is important.

For example, Patent Literature 1 describes an industrial computer that controls machines via a field network. The industrial computer includes a communication scheduler for controlling communication that is performed cyclically. When receiving a request to transmit data from a program, the communication scheduler temporarily stores the data, and controls the timing to transmit the data using a predetermined timeslot. The communication scheduler thus enables communication in multiple different cycles.

CITATION LIST

Patent Literature

Patent Literature 1: Japanese Unexamined Patent Application Publication No. 2010-224939

SUMMARY

Technical Problem

When a communication master in a field network receives communication instructions from a plurality of control programs, the master can have physical collisions in its communication. To avoid such communication collisions, the communication master in Patent Literature 1 schedules communication by associating a command value output after execution of each control program with the transmission timing, as well as with the execution cycle of the corresponding control program.

Communication via the field network may shorten the time taken for the series of operations, from obtaining input data from an external device, performing computation to obtain output data, and to outputting the data to the external device. This may enable highly accurate control.

Solution to Problem

One aspect of the present invention provides a controller for controlling a device connected thereto via a network by transmitting a computational result to the device. The controller includes a microprocessor, a memory configured to store a plurality of control programs and a system program, and a communication controller module configured to operate as a communication interface with the network. The system program includes a scheduler program configured to control timing at which the microprocessor executes the control programs. Each of the control programs includes a communication instruction configured to cause the communication controller module to transmit the computational result to the device connected via the network. The microprocessor is configured to execute the control programs in parallel. The scheduler program is configured to cause the microprocessor to generate a communication instruction in a manner to allow the communication instruction included in each of the control programs to be executed in parallel without colliding with a communication process performed by the communication controller module.

Advantageous Effects

The controller according to one or more embodiments of the present invention executes a plurality of control programs in parallel using a multi-core processor in shorter cycles while preventing communication collisions between the programs.

BRIEF DESCRIPTION OF THE DRAWINGS

FIG. 6 is a diagram showing a screen for setting control programs.

DETAILED DESCRIPTION

System Configuration

A controller according to one or more embodiments of the present invention controls a control target, such as a machine or a device. The controller according to the present embodiment includes a central processing unit (CPU) module. The CPU module includes a microprocessor, a storage unit including a main memory for the microprocessor, and a communication circuit. The CPU module included in the controller according to the present embodiment controls a control target by repeating the operations of transmitting output data, receiving input data, and executing a control program for generating output data using input data.

The storage unit stores control programs, and a system program for controlling execution of the control programs and input and output of the input data and the output data. The microprocessor executes the system program and the control programs stored in the storage unit.

The communication circuit transmits output data and receives input data. As described below, the controller according to the present embodiment includes, as the communication circuit, a first communication circuit, which transmits output data and receives input data via a controller system bus, and a second communication circuit, which transmits output data and receives input data via a field network.

Figure 1:
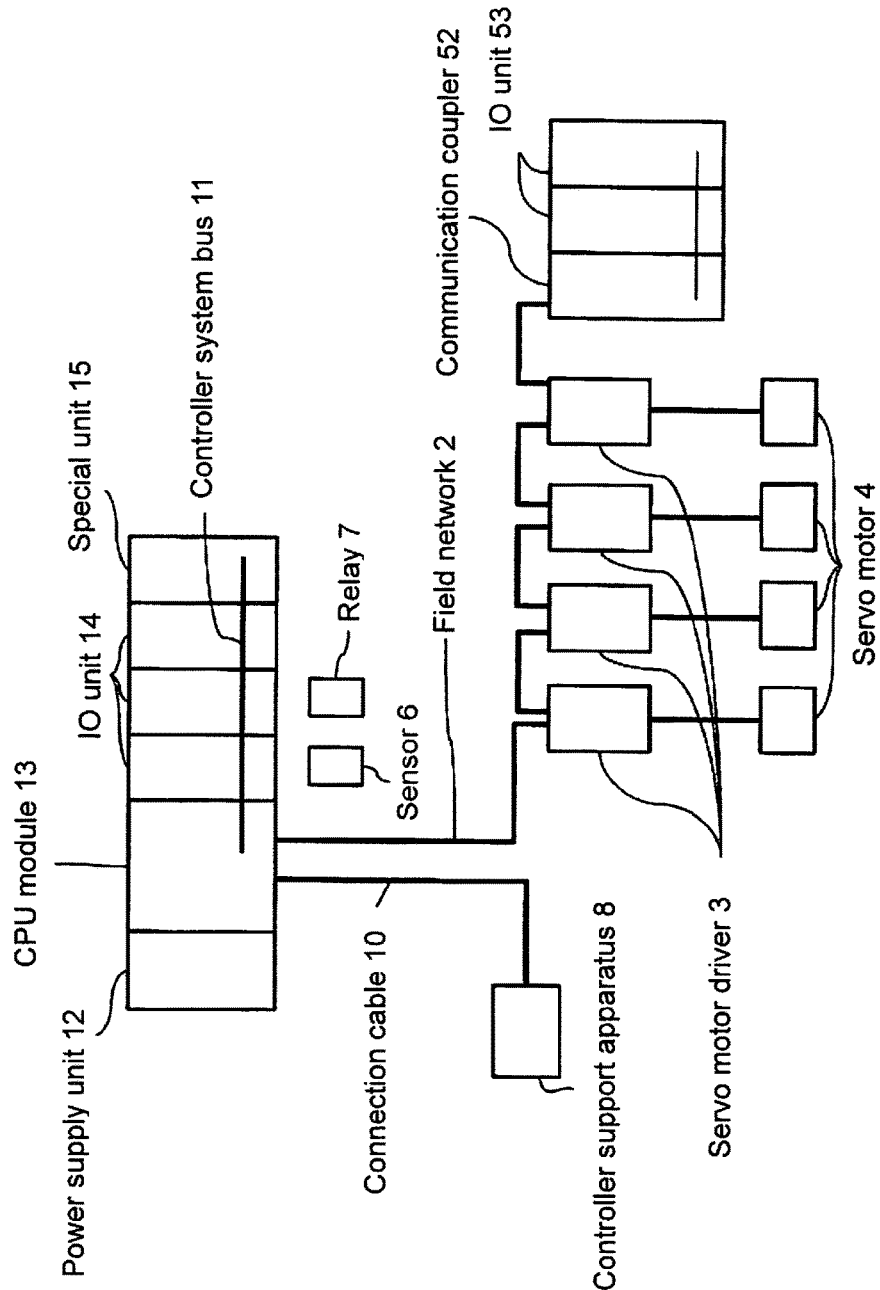
FIG. 1 is a diagram showing a system combining servo motors and servo motor drivers according to one embodiment of the present invention.

The system configuration of a controller 1 according to the present embodiment will now be described with reference to FIG. 1. FIG. 1 is a schematic block diagram showing the schematic configuration of a controller system according to the present embodiment. Referring to FIG. 1, a controller system SYS includes the controller 1, servo motor drivers 3 and a remote IO terminal 5, which are connected to the controller 1 via a field network 2, and a sensor 6 and a relay 7, which are field devices. The controller 1 is also connected to a controller support apparatus 8 with, for example, a connection cable 10.

The controller 1 includes a CPU module 13, which performs main computation, one or more IO units 14, and a special unit 15. These units can transmit and receive data between them via a controller system bus 11. These units receive an appropriate voltage provided from a power supply unit 12. The units included in the controller 1 are provided from the manufacturer of the controller. The controller system bus 11 may thus be uniquely developed and used by the controller manufacturer. In contrast, the field network 2 (described later) may typically comply with the standards available to the public to allow products from different manufacturers to be connected to the network.

Figure 2:
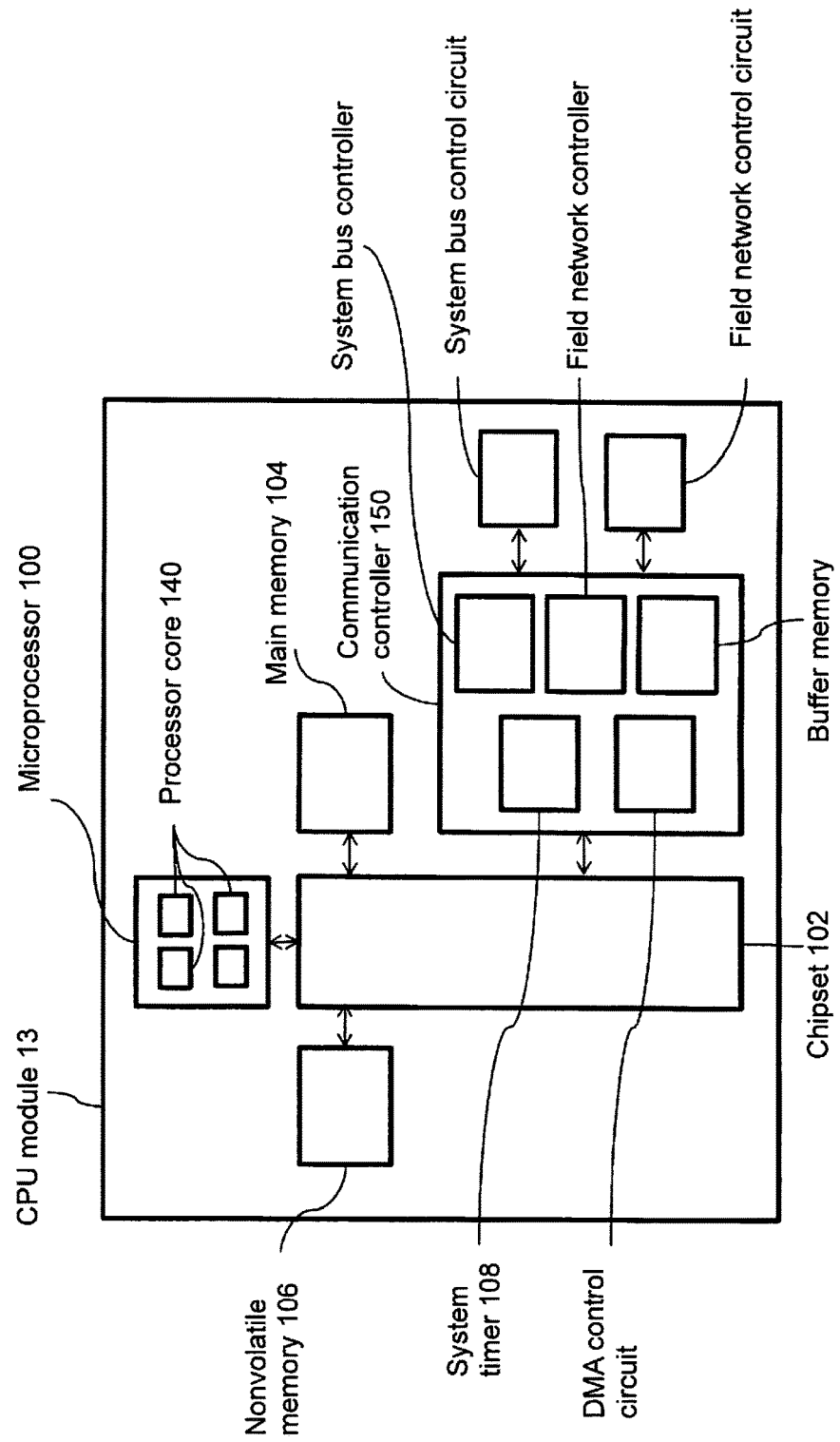
FIG. 2 is a diagram showing the hardware configuration of a CPU module.

The CPU module 13 will be described in detail later with reference to FIG. 2. The IO unit 14 performs typical input and output processing. The IO unit 14 receives or outputs binary data, such as data with the on or off state. More specifically, the IO unit 14 obtains information indicating whether a sensor, such as the sensor 6, has detected an object (on-state) or has detected no object (off-state). The IO unit 14 also transmits an activation command (on) or a deactivation command (off) to a designated unit, such as the relay 7 or an actuator.

The special unit 15 has functions that are not supported by the IO unit 14, such as input and output of analogue data, temperature control, and communication with a specific communication scheme.

The field network 2 can carry various data, which is transmitted to and received from the CPU module 13. The field network 2 may be industrial Ethernet (registered trademark). Variants of industrial Ethernet (registered trademark) include EtherCAT (registered trademark), Profinet IRT, MECHATROLINK (registered trademark)-III, Powerlink, SERCOS (registered trademark)-III, and CIP Motion. Any of these field networks may be used. The field network 2 may be any field network other than industrial Ethernet (registered trademark). For example, the field network 2 may be DeviceNet or CompoNet/IP (registered trademark) when motion control is not performed. The controller system SYS according to the present embodiment typically uses EtherCAT (registered trademark), which is industrial Ethernet (registered trademark), as the field network 2.

The CPU module 13 in the controller 1 may also function as the IO unit 14 or as the servo motor drivers 3. In this case, the CPU module 13 may directly control a target using its internal functions, without using the IO unit 14 or the servo motor drivers 3.

The servo motor drivers 3 are connected to the CPU module 13 via the field network 2. Each servo motor driver 3 drives a servo motor 4 in accordance with a command value provided from the CPU module 13. More specifically, each servo motor driver 3 receives command values including a position command value, a speed command value, and a torque command value from the controller 1 in constant cycles. The servo motor driver 3 also receives measured values associated with the operation of the servo motor 4, including the measured values indicating the position, the speed (typically calculated from a difference between the current position and the previous position), and the torque, from sensors including a position sensor (rotary encoder) and a torque sensor, which are connected to the shaft of each servo motor 4. Each servo motor driver 3 then sets the command values received from the CPU module 13 as target values, and sets the measured values as feedback values, and performs feedback control using the set values. In other words, the servo motor driver 3 controls the electric current for driving the servo motor 4 to allow the measured values to approach the target values. The servo motor driver 3 may also be referred to as a servo motor amplifier.

Although FIG. 1 shows the system combining the servo motors 4 and the servo motor drivers 3, the system may have another structure combining, for example, pulse motors and pulse motor drivers.

The controller system SYS shown in FIG. 1 further includes the remote IO terminal 5 connected to the field network 2. The remote IO terminal 5 basically performs typical input and output processing in the same manner as the IO unit 14. More specifically, the remote IO terminal 5 includes a communication coupler 52 for performing processing associated with data transfer via the field network 2, and one or more IO units 53. These units can transmit and receive data between them via a remote IO terminal bus 51.

The controller support apparatus 8 will be described later.

Hardware Configuration of CPU Module

The hardware configuration of the CPU module 13 will now be described with reference to FIG. 2. FIG. 2 is a schematic block diagram showing the hardware configuration of the CPU module 13 according to the embodiment of the present invention. As shown in FIG. 2, the CPU module 13 includes a microprocessor 100, processor cores 140 included in the microprocessor 100, a chipset 102, a main memory 104, a nonvolatile memory 106, a system timer 108, a communication controller 150, a system bus controller 120, a field network controller 140, and a USB connector (not shown). The chipset 102 is connected to other components with the corresponding buses.

The microprocessor 100 and the chipset 102 typically comply with the general-purpose computer architecture. More specifically, the microprocessor 100 interprets and executes instruction codes that are sequentially provided from the chipset 102 in accordance with the internal clock. The chipset 102 transmits and receives internal data to and from the components connected to the chipset 102, and generates instruction codes intended for the microprocessor 100. The chipset 102 further cashes data resulting from computation executed by the microprocessor 100.

The CPU module 13 includes the main memory 104 and the nonvolatile memory 106 as its storage units.

The main memory 104 is a volatile storage area, which is a random-access memory (RAM). The main memory 104 stores programs to be executed by the microprocessor 100 after the CPU module 13 is powered on. The main memory 104 is also used as a work memory when the microprocessor 100 executes programs. The main memory 104 may be, for example, a dynamic random access memory (DRAM) or a static random access memory (SRAM).

The nonvolatile memory 106 stores a real time operating system (OS), a system program for the controller 1, a user program, and a motion computing program, and data such as system setting parameters in a nonvolatile manner. These programs and data are copied into the main memory 104 when necessary to allow the microprocessor 100 to access such programs and data. The nonvolatile memory 106 may be a semiconductor memory such as a flash memory, or may be a magnetic recording medium such as a hard disk drive, or may be an optical recording medium such as a digital versatile disk random access memory (DVD-RAM).

The communication controller is typically implemented using hardware such as a field-programmable gate array (FPGA) or an application specific integrated circuit (ASIC). The communication controller can transmit and receive data to and from the main memory through the chipset. The communication controller includes a memory area used for data communication with the main memory. The communication controller transfers data that has been transferred from the main memory to a system bus controller or a field network controller (described later). The communication controller also generates an instruction to transmit data transferred from the main memory, and transmits the generated instruction to the system bus controller and the field network controller.

The communication controller further includes a system timer 108. The system timer 108 generates an interrupt signal and transmits the signal to the microprocessor 100 in constant cycles. Although the system timer 108 is typically designed to generate interrupt signals in multiple different cycles depending on the hardware specifications, the system timer 108 may generate interrupt signals in a selected cycle using, for example, an operating system (OS) or a basic input output system (BIOS). The interrupt signals generated by the system timer 108 are used to perform the control operations for each control cycle (described later).

The system bus controller 120 and the field network controller 140 serve as communication circuits. These communication circuits transmit output data and receive input data.

When the CPU module 13 functions as the IO unit 14 or the servo motor driver 3, the CPU module 13 has the corresponding internal functions of transmitting the output data and receiving the input data, which replace the transmission and reception functions of the system bus controller 120.

The communication controller 150 controls data communication via the controller system bus 11. More specifically, the communication controller 150 includes the system bus controller 120, a dynamic memory access (DMA) control circuit 122, and a buffer 126.

The buffer 126 functions as a transmission buffer for transmitting data to be output to other units via the controller system bus 11 (hereafter referred to as output data or first output data), and functions as a reception buffer for receiving data input from other units via the controller system bus 11 (hereafter referred to as input data or first input data). The first output data resulting from the computation performed by the microprocessor 100 is first stored into the main memory 104. The first output data to be transferred to a specific unit is read from the main memory 104, and is then stored temporarily into the buffer 126. The first input data transferred from another unit is temporarily stored into the buffer 126, and is then transferred to the main memory 104.

The DMA control circuit 122 transfers the first output data from the main memory 104 to the buffer 126, and transfers the first input data from the buffer 126 to the main memory 104.

The communication controller transmits the first output data stored in the buffer 126 to another unit that is connected to the controller system bus 11, and also stores the first input data received from the unit into the buffer 126. The system bus communication controller typically functions as a physical layer and a data link layer in the controller system bus 11.

The field network controller 140 controls data communication via the field network 2. More specifically, the field network controller 140 controls transmission of output data and reception of input data in accordance with the standards of the field network 2. As described above, the field network 2 according to the present embodiment complies with EtherCAT (registered trademark). The field network controller 140 thus includes hardware for performing common Ethernet (registered trademark) communication. Under EtherCAT (registered trademark), a common Ethernet (registered trademark) controller with a communication protocol complying with the common Ethernet (registered trademark) standards may be used. When a particular variant of industrial Ethernet (registered trademark) is used as the field network 2, a special Ethernet (registered trademark) controller that complies with a dedicated communication protocol different from the common communication protocol may be used. When a field network other than industrial Ethernet (registered trademark) is used, a field network controller that complies with the corresponding standards is to be used.

A buffer functions as a transmission buffer for transmitting data output to other devices via the field network 2 (hereafter also referred to as output data or second output data), and functions as a reception buffer for receiving data input from other devices via the field network 2 (hereafter also referred to as input data or second input data). The second output data resulting from the computation performed by the microprocessor 100 is first stored into the main memory 104. The second output data to be transferred to a specific device is read from the main memory 104, and then is stored temporarily into the second communication circuit buffer 146. The second input data transferred from other devices is stored temporarily into the buffer 146, and is then transferred to the main memory 104.

The DMA control circuit 142 transfers the second output data from the main memory 104 to the buffer, and transfers the second input data from the buffer to the main memory 104.

The field network controller 140 transmits the second output data stored in the buffer to other devices connected to the field network 2. The field network controller 140 also receives the second input data from other devices connected to the field network 2, and stores the data into the buffer in the second communication circuit. The field network controller 140 typically functions as a physical layer and a datalink layer in the field network 2.

The USB connector is an interface for connecting the controller support apparatus 8 and the CPU module 13. Through the USB connector, the controller 1 typically obtains programs executable by the microprocessor 100 included in the CPU module 13, which are transferred from the controller support apparatus 8.

Software Configuration of CPU Module

Software implemented to achieve various functions according to the present embodiment will now be described with reference to FIG. 3. The software includes instruction codes that are read at appropriate timing and executed by the microprocessor 100 and the processor cores 140 included in the CPU module 13.

Figure 3:
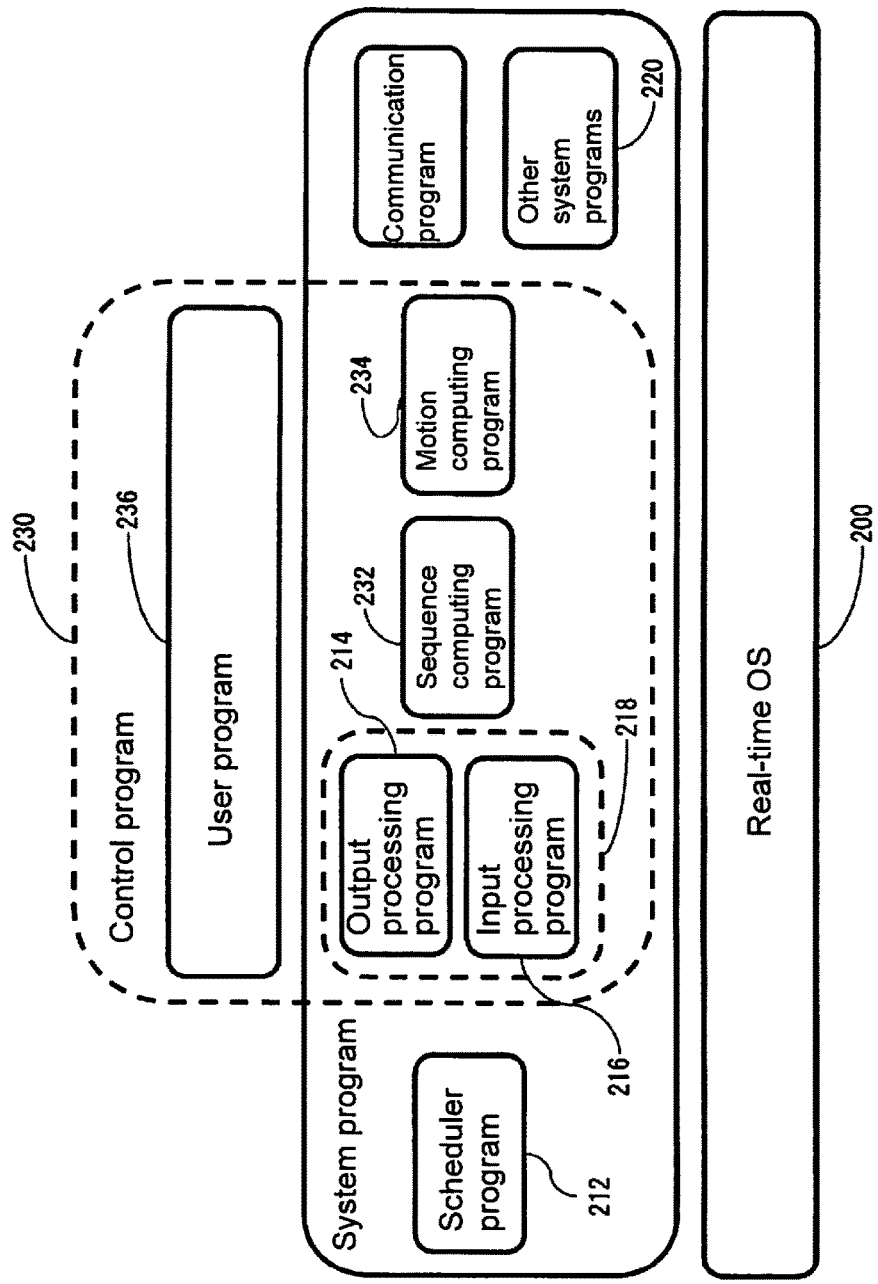
FIG. 3 is a schematic block diagram showing the configuration of software implemented in the CPU module according to one embodiment of the present invention.

FIG. 3 is a schematic block diagram showing the configuration of software implemented by the CPU module 13 according to the embodiment of the present invention. As shown in FIG. 3, the software executed by the CPU module 13 includes three layers, namely, a real-time OS 200, a system program 210, and a user program 236.

The real-time OS 200 is designed in accordance with the computer architecture of the CPU module 13. The real-time OS 200 provides a basic environment in which the microprocessor 100 executes the system program 210 and the user program 236.

The system program 210 is software for enabling the capabilities of the controller 1. More specifically, the system program 210 includes a scheduler program 212, an output processing program 214, an input processing program 216, a sequence instruction computing program 232, a motion computing program 234, and other system programs 220. The output processing program 214 and the input processing program 216, which are normally executed successively (or integrally), may be collectively referred to as an IO processing program 218.

The user program 236 is generated in accordance with the user's control purpose. In other words, the user program 236 can be designed freely using the controller system SYS in accordance with, for example, a target line (process) to be controlled.

As described later, the user program 236 serves the user's control purpose in cooperation with the sequence instruction computing program 232 and the motion computing program 234. In other words, the user program 236 uses instructions, functions, and functional modules provided from the sequence instruction computing program 232 and the motion computing program 234 to perform the programmed operations. The user program 236, the sequence instruction computing program 232, and the motion computing program 234 may also be collectively referred to as a control program 230.

As described above, the microprocessor 100 included in the CPU module 13 executes the system program 210 and the control program 230 stored in the storage unit.

The programs will now be described in more detail. As described above, the user program 236 is generated in accordance with the user's control purpose (e.g., a target line or process). The user program 236 is typically an object program executable by the microprocessor 100 included in the CPU module 13. The user program 236 is generated by compiling a source program written in, for example, a ladder language in the controller support apparatus 8. The generated user program 236 as an object program is then transferred from the controller support apparatus 8 to the CPU module 13 via the connection cable 10, and is stored into a memory, such as the nonvolatile memory 106.

The scheduler program 212 controls the starting of processing and the resuming of suspended processing in each execution cycle of the output processing program 214, the input processing program 216, and the control programs 230. More specifically, the scheduler program 212 controls the execution of the user program 236 and the motion computing program 234.

The CPU module 13 according to the present embodiment uses constant execution cycles (control cycles) suited to the motion computing program 234 as common cycles for the entire processing. The entire processing cannot be complete within one control cycle. Thus, the processing is divided into a plurality of processing portions, which are then categorized as either a processing portion to be completed in one control cycle or a processing portion that may be executed over a plurality of control cycles based on the priority of each processing portion to be executed. The scheduler program 212 manages the execution order of such processing portions. Within each control cycle time, the scheduler program 212 executes a program with a higher priority at earlier timing.

The output processing program 214 reconfigures the output data generated when the user program 236 (control program 230) is executed into a format suitable for being transferred to the communication controller. When the system bus controller 120 or the field network controller 140 uses a transmission instruction from the microprocessor 100, the output processing program 214 generates the transmission instruction.

The input processing program 216 reconfigures the input data received by the system bus controller 120 and/or the field network controller 140 into a format suitable for use by the control program 230.

The sequence instruction computing program 232 is called when a certain sequence instruction used in the user program 236 is executed. The sequence instruction computing program 232 is executed to enable the processing corresponding to the instruction.

The motion computing program 234 is executed in accordance with an instruction provided from the user program 236 to compute a command value to be output to a motor driver, such as a servo motor driver 3 and a pulse motor driver.

A communication program causes the processing associated with communication via the field network or the system bus. The communication program yields data telegram suitable for transmission via the field network or the system bus using the setting parameters, which will be described later. The communication program also controls the timing to transmit data via the field network or the system bus in cooperation with the scheduler program and the output processing program.

The other system programs 220 are a group of programs that enable the various capabilities of the controller 1, other than the programs shown individually in FIG. 3. The other system programs 220 include, for example, programs enabling the microprocessor to implement communication with controllers of machines, processing in response to requests from external devices, and self-diagnostic processing. The system programs 220 further include programs enabling transfer of data from the main memory to external storage media or readout of data from external storage media.

The real-time OS 200 provides an environment in which a plurality of programs are switched with time and are executed. In the initial setting, the controller 1 according to the present embodiment includes an interrupt to start a control cycle, which is an event (interrupt) for outputting (transmitting) output data resulting from execution of a program by the CPU module 13 to another unit or device. When an interrupt to start a control cycle occurs, the real-time OS 200 switches the execution target of the microprocessor 100 from the program being executed during the interrupt to the scheduler program 212. The real-time OS 200 executes a program included in the system program 210 when neither the scheduler program 212 nor a program controlled by the scheduler program 212 is executed. For example, the real-time OS 200 may execute a program associated with communication between the CPU module 13 and the controller support apparatus 8 via the connector cable 10 (USB).

The control programs 230 and the scheduler program 212 are stored into the main memory 104 and the nonvolatile memory 106, which are the storage units.

Hardware Configuration of Support Apparatus

The controller support apparatus 8 for generating programs to be executed by the controller 1 or performing maintenance of the controller 1 will now be described.

Figure 4:
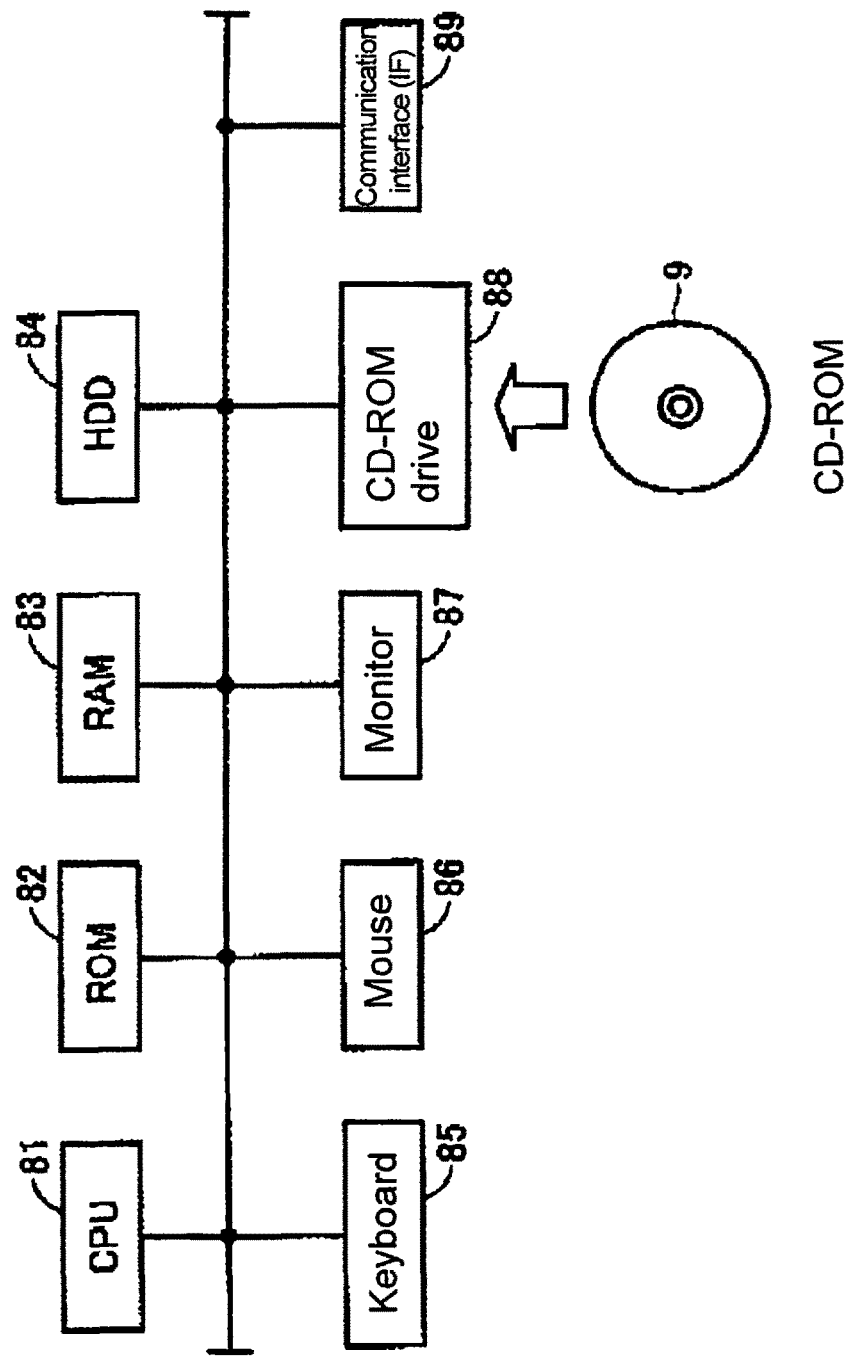
FIG. 4 is a schematic block diagram showing the hardware configuration of the controller according to one embodiment of the present invention.

FIG. 4 is a schematic block diagram showing the hardware configuration of the controller support apparatus 8 according to the present embodiment. Referring now to FIG. 4, the controller support apparatus 8 is typically a general-purpose computer. For ease of maintenance, the controller support apparatus 8 may be a notebook computer that can be carried easily.

As shown in FIG. 4, the controller support apparatus 8 includes a CPU 81, which executes various programs including an operating system (OS), a read-only memory (ROM) 82, which stores the BIOS or other data, a memory RAM 83, which provides a work area for storing data used for the CPU 81 in executing programs, and a hard disk (HDD) 84, which stores various programs to be executed by the CPU 81 in a nonvolatile manner. The CPU 81 corresponds to the computing unit of the controller support apparatus 8. The ROM 82, the RAM 83, and the hard disk 84 correspond to the storage unit of the controller support apparatus 8.

The controller support apparatus 8 further includes a keyboard 85 and a mouse 86, which receive an operation performed by the user, and a monitor 87, which displays information to the user. The controller support apparatus 8 further includes a communication interface (IF) 89, which allows communication with, for example, the controller 1 (CPU module 13).

As described later, the programs executed by the controller support apparatus 8 are stored in a compact disk read-only memory (CD-ROM) 9 and are distributed. The programs stored in the CD-ROM 9 are read by a CD-ROM drive 88 and then stored in, for example, the hard disk 84. The programs may also be downloaded from an upper host computer via a network.

Control Program

In the present embodiment, the control programs serve as execution units for a series of operations including operations caused by an IO processing program and a user program, as well as by a sequence computing program and a motion computing program that are executed in combination with the user program.

To generate programs that are executed in parallel, the user considers various timing requirements such as the start and end timing or the timing to copy data. This increases the burden on the user.

In the present embodiment, the execution cycles and the execution priority are set for each control program, and the execution start timing as well as the limiting conditions are set for each control program to allow each program to be executed in a shorter cycle. The scheduler program causes the microprocessor to execute each control program in accordance with its execution priority as well as its execution cycle.

A control program 1 has the highest priority. The control program 1 executes an output processing program 1 to generate output data and an input processing program 1 to obtain input data, and executes a user program 1 assigned to this control program, executes a motion computing program 1, and computes a command value to be output to a motor. The control program 1 causes this series of operations to be executed in the stated order.

A control program 2 has the second highest priority after the control program 1. The control program 2 executes an output processing program 2 to generate output data and an input processing program 2 to obtain input data, and executes a user program 2 assigned to this control program, and executes a motion computing program 2. The control program 1 causes this series of operations to be executed in the stated order.

A control program 3 is executed in constant cycles. The control program 3 uses the output data and the input data obtained by the control program 1. More specifically, the control program 3 receives the input data resulting from the IO refresh performed by the control program 1, and generates output data in every predetermined cycle.

The control program 3 allows a program that may take a relatively long execution cycle to be assigned. Assigning such a program included in the control program 1 to the control program 3 will shorten the execution cycle of the control program 1. A control program 4, which includes only user programs, is used for processing unrelated to high-speed control computing, and is used for programming communication or backup processing.

Figure 5:
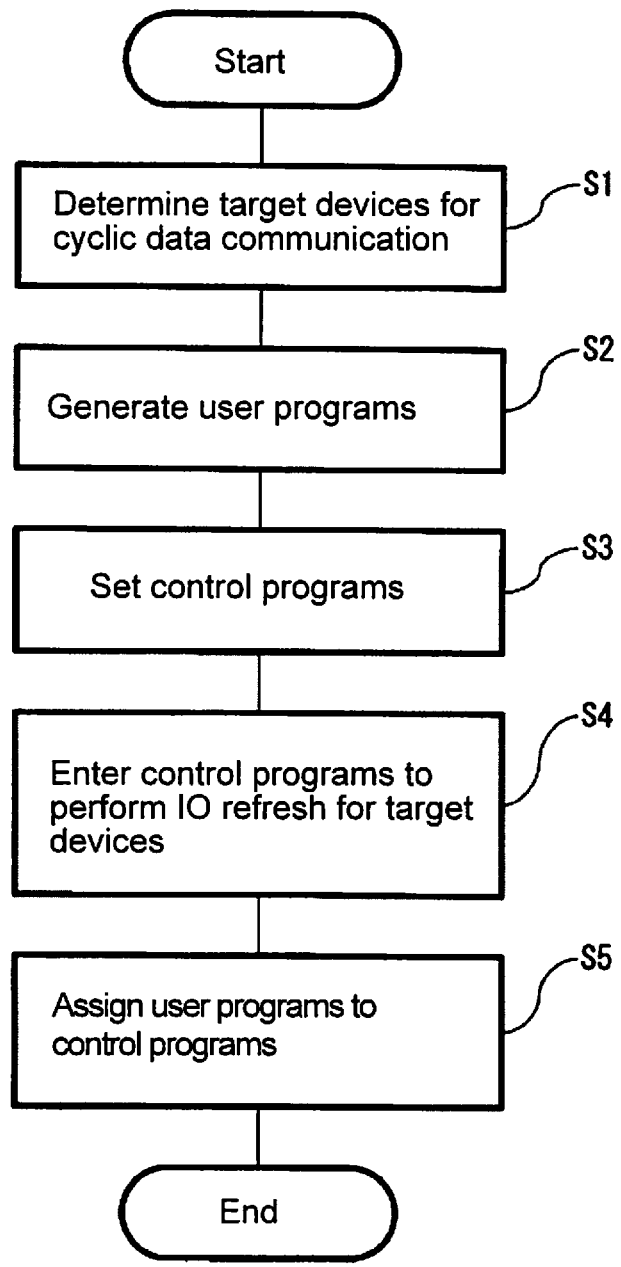
FIG. 5 is a flowchart showing a procedure for settings performed in the controller.

A procedure of programming performed by the controller using the controller support apparatus will now be described. FIG. 5 is a flowchart showing a procedure for settings performed in the controller.

In step S1, target devices to be connected to the field network or to the system bus are designated. More specifically, information to enable communication with the target devices that have been connected to the field network or the system bus is set. Although not shown, communication may be performed with devices that have been connected to the field network or the system bus to automatically obtain information about the connected devices or about the connections between these devices.

In step S2, the user generates user programs in the manner described above in accordance with its control purpose by using the controller support apparatus. Using data received from each target device connected to the field network or the system bus designated in step S1, the user generates a program that causes execution of sequence computation and motion computation and generates output data. The user may generate a user program divided in a plurality of program modules.

In step S3, the user sets control programs. The user sets the execution cycles of these control programs in accordance with the control purpose.

In step S4, the user enters control programs for which IO refresh is to be performed for the target devices connected to the network designated in step S1. FIG. 6 is a diagram showing a screen for setting the control programs. The user enters a control program for which IO refresh is to be performed for each target device connected to the field network or to the system bus. The screen lists the target devices together with their unit names. For each target device, the user selects a control program for which IO refresh is to be performed using the pulldown menu.

Figure 7:
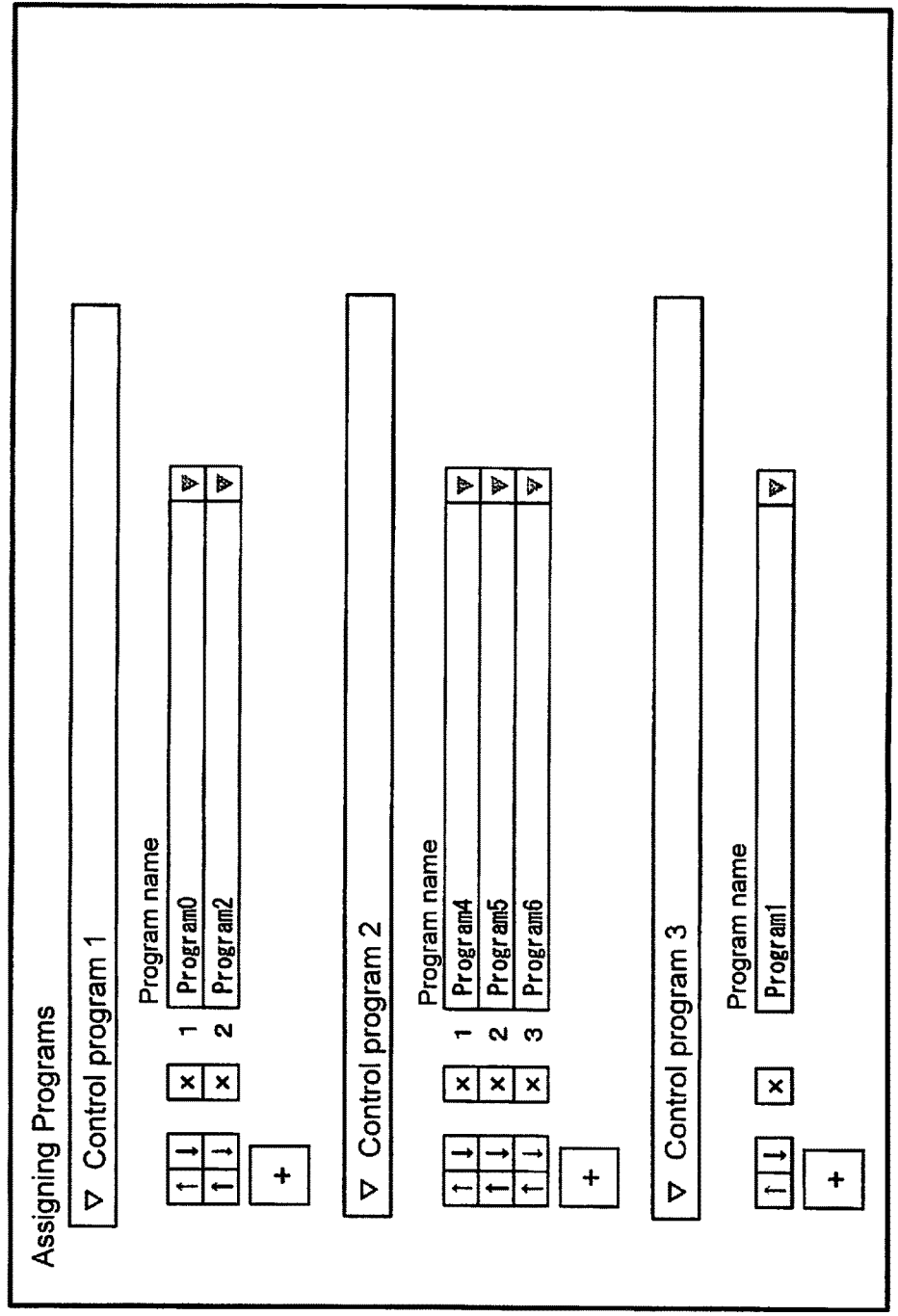
FIG. 7 is a diagram showing a screen for assigning programs.

In step S5, the user assigns the generated user programs to the control programs. FIG. 7 is a graphical view showing assigning of the user programs to the control programs. In FIG. 7, the generated user programs (Programs 0 to 6) are assigned to the control programs. When assigning a plurality of user programs to one control program, the user sets the execution order for these user programs. In the example shown in FIG. 7, the user programs Program 0 and Program 2 are assigned to the control program 1. The user programs Program 4, Program 5, and Program 6 are assigned to the control program 2. Program 1 is assigned to the control program 3.

With the procedure described above, the user generates control programs, each of which includes information about the execution cycle, the setting parameters indicating the devices to transmit and receive data under the IO control program included in the control program, and the user program(s) to be executed. The scheduler program included in the controller refers to the setting parameters that have been transferred, refers to the execution cycle of the control program, and controls the timing to start or end the program execution. In the present embodiment, the control programs are executed in execution cycles in which communication (10 refresh) with the external devices connected to the field network or the system bus are performed. The communication program thus sets the communication cycles and designates target devices to undergo IO refresh in the set communication cycles based on the setting parameters.

First Embodiment

Executing Control Programs in Parallel and Communication Collision

Figure 8:
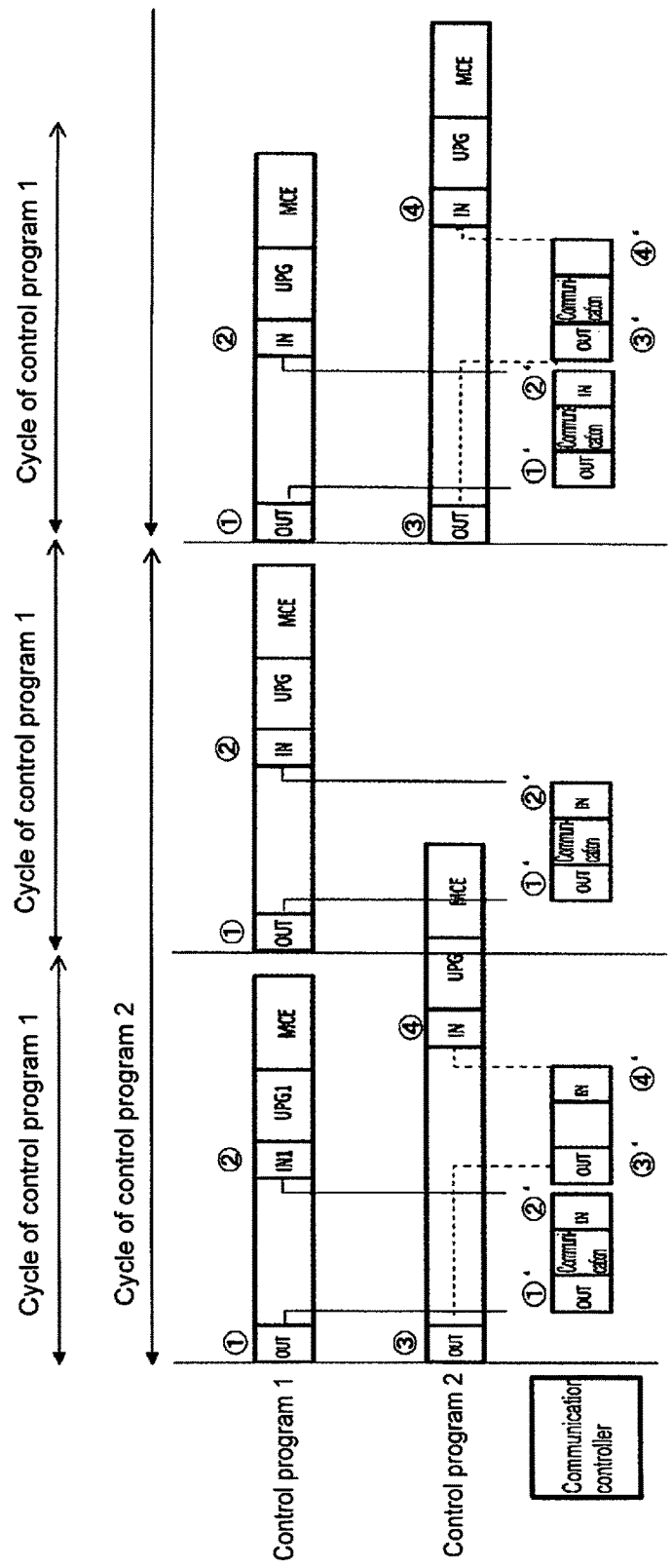
FIG. 8 is a diagram showing the scheduling of communication for executing the control programs.

FIG. 8 is a diagram showing the scheduling of communication for executing the control programs. The scheduler program monitors time measured by a timer. When detecting that a predetermined time comes, the scheduler program causes a core 1 included in the microprocessor to start executing the control program 1 and the control program 2 in parallel.

In accordance with an instruction provided from the output processing program 1 included in the control program 1, the core 1 reads output data associated with the control program 1 from the main memory, and transfers the output data to the buffer included in the communication controller. The core 1 also generates an instruction to specify the time at which the communication controller transmits the output data (processing (1)). The number in parentheses corresponds to the circled number in the figure. The same applies hereafter.

When the specified transmission time comes, the communication controller transmits the received output data for the control program 1 to external devices via the field network controller or the system bus controller (processing (1')).

The communication controller receives input data from the external devices through communication via the field network or the system bus. The communication controller transmits the received input data from its buffer to a communication buffer included in the main memory (processing (2')). When the transmission from the communication controller completes, the input data is copied from the communication buffer in the main memory into an area for computation in accordance with an instruction provided from the input processing program 1 (processing (2)).

In accordance with an instruction provided from the user program 1, the core 1 included in the microprocessor performs sequence computation using the input data stored in the computation area for the user program 1, and stores the obtained output data into the communication buffer. The core 1 also performs computation using the input data to obtain data for motion control. The core 1 transfers the computed data for motion control to a work area for the motion control program.

In accordance with an instruction provided from the motion computing program 1, the core 1 included in the microprocessor performs computation using the motion computing program 1 to obtain a command value for a motor corresponding to the control cycle of the control program 1, and obtains output data. The core 1 transfers the output data to its buffer area, from which the output data is to be transferred to the communication controller. The core 1 executes this series of operations in predetermined cycles set in the control program 1.

In accordance with an instruction provided from the output processing program 2 included in the control program 2, the core 2 reads the output data associated with the control program 2 from the main memory, and transfers the output data to the buffer in the communication controller. The core 2 also generates an instruction to specify the transmission time at which the communication controller transmits the output data associated with the control program 2 (processing (3)). The transmission time at which the output data is transmitted from the communication controller is set to prevent the transmission of the output data associated with the program 1 from colliding with communication performed in the communication controller.

To calculate the transmission time, the time at which the communication controller completes its transmission of the output data and reception of the input data associated with the control program 1 is calculated in cooperation with the communication program. The time is determined in advance based on the communication path length or the amount of data to be transmitted, and then the time taken for communication performed via the field network or the system bus is calculated.

For the transmission of the output data and the reception of the input data associated with the control program 1, the time when the communication bandwidth will not be busy may be determined in advance.

When the specified time comes, the communication controller transmits the received output data for the control program 2 to the external devices via the field network controller or the system bus controller (processing (3')).

The communication controller receives input data associated with the control program 2 from the external devices through communication via the field network or the system bus. The communication controller transmits the received input data from its buffer to the communication buffer in the main memory (processing (4')). When the transmission from the communication controller completes, the input data is copied from the communication buffer in the main memory into an area for computation in accordance with an instruction provided from the input processing program 2 (processing (4)).

In accordance with an instruction provided from the user program 2, the core 2 included in the microprocessor performs sequence computation using the input data stored in the computation area for the user program 2, and stores the obtained output data into the communication buffer. The core 2 also performs computation using the input data to obtain data for motion control. The core 2 transfers the computed data for motion control to a work area for the motion control program.

In accordance with an instruction provided from the motion computing program 2, the core 2 included in the microprocessor performs computation using the motion computing program 2 to obtain a command value for a motor corresponding to the control cycle of the control program 2, and obtains output data. The core 2 transfers the output data to its buffer area, from which the output data is to be transferred to the communication controller.

In the illustrated example, the control program 2 is executed in the cycle twice as long as the execution cycle of the control program 1. In some embodiments, the control program 2 may be executed in a cycle that is multiple times longer than the execution cycle of the control program 1, or may be executed in the same execution cycle as the control program 1.

This structure allows execution of a plurality of control programs in parallel without causing communication collisions in the communication controller. The communication involved in the control program 1 is performed with higher priority. This further shortens the time taken to perform the series of operations from receiving input data to transmitting output data.

The user may set a control program to be executed in a short cycle as the control program 1, and may set another control program that may be executed in a longer cycle as the control program 2 in accordance with his or her control purpose. In this case, the user can generate programs that serve the control purpose without thinking about the communication.

Second Embodiment

Figure 9:
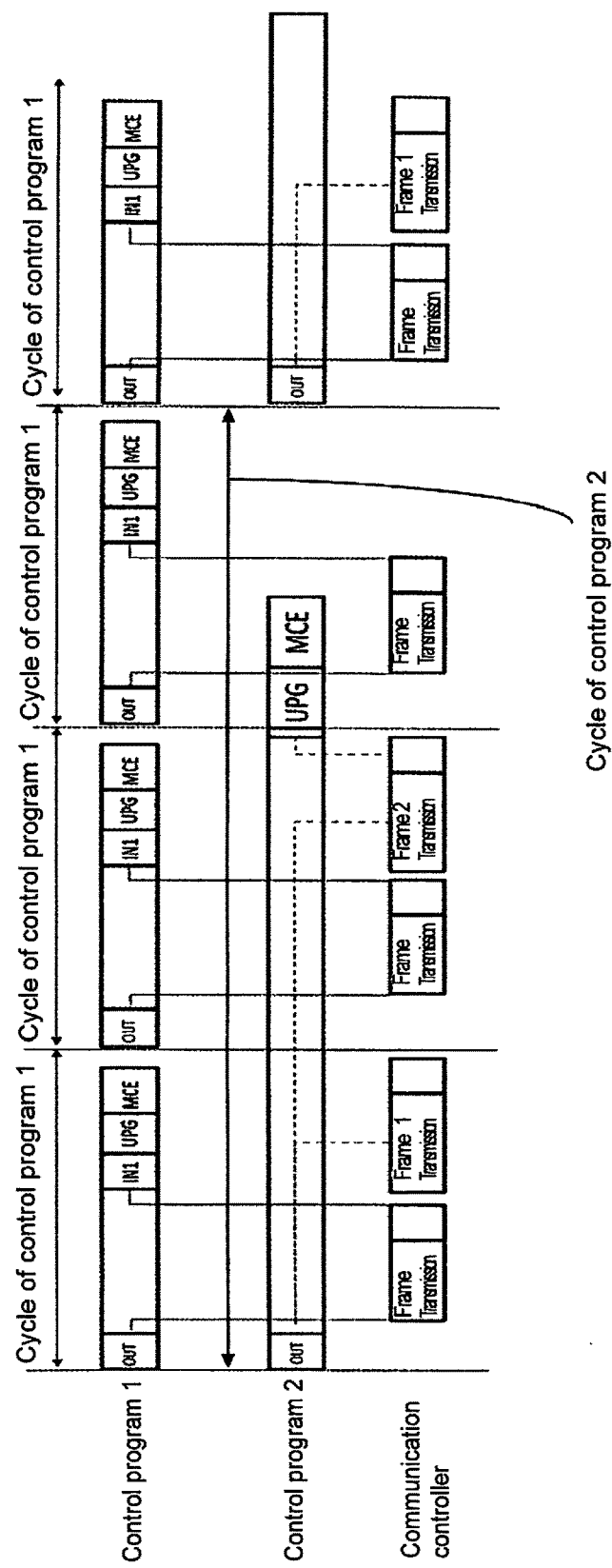
FIG. 9 is a diagram describing execution of the control program 2 when the data is divided into a plurality of frames and is transmitted.

FIG. 9 is a diagram describing execution of the control program 2 when the data is divided into a plurality of frames and is transmitted. When a predetermined execution cycle comes, the scheduler program causes a core 1 and a core 2 to start executing the control program 1 and the control program 2 in parallel. The control program 1 is executed in the same manner as described in the first embodiment, and will not be described.

When many devices are connected to the field network or the system bus, the communication frame (also referred to as data telegram) to be transmitted via the field network or the system bus may not accommodate the data associated with execution of the control program 2. In this case, in accordance with an instruction provided from the output processing program, the core 2 reads, in cooperation with the communication program, the output data associated with the control program 2 from the main memory, divides the output data into two frames, and transfers the resultant frames to the buffer memory in the communication controller. The core 2 also transmits an instruction specifying the transmission time for each frame to the communication controller.

When the specified transmission time for each frame comes, the communication controller transmits the divisional output data associated with the control program 2. The transmission time is calculated in cooperation with the communication program and is set to avoid colliding with the communication associated with the control program 1.

More specifically, the time when the communication bandwidth will not be busy in the predetermined execution cycle of the control program 1 is determined. The transmission delay caused by the total cable length is determined. The time taken to transmit the frame data is determined. The transmission time is then set based on the obtained information.

When the transmission time for the frame comes (processing (1)) (the number in parentheses corresponds to the circled number in the figure), the communication controller transmits the frame via the field network or the system bus. More specifically, the communication controller transmits the output data to the external devices connected to the field network, and stores the input data received from the external devices into the buffer of the communication controller.

When the transmission time for the divisional frame comes (processing (2)), the communication controller transmits the frame via the field network or the system bus. More specifically, the communication controller transmits the output data to the external devices connected to the field network, and stores the input data received from the external devices into the buffer in the communication controller. After all the input data has been stored into the buffer in the communication controller, the communication controller transfers the data to the communication buffer in the main memory.

In accordance with an instruction provided from the input processing program, the data is transferred from the communication buffer in the main memory to a work area for the user program 2.

In accordance with an instruction provided from the user program 2, the core 2 included in the microprocessor performs sequence computation using the input data stored in the work area for the user program 2, and stores the obtained output data into the communication buffer. The core 2 also performs computation using the input data to obtain data for motion control. The core 2 transfers the obtained data for motion control to a work area for the motion control program.

In accordance with an instruction provided from the motion computing program 2, the core 2 included in the microprocessor performs computation using the motion computing program 2 to obtain a command value for a motor corresponding to the control cycle of the control program 2, and obtains output data. The core 2 transfers the output data to its buffer area, from which the output data is to be transferred to the communication controller.

REFERENCE SIGNS LIST

1 controller
8 controller support apparatus
14, 53 IO unit
122, 142 DMA control circuit
210, 220 system program
214 output processing program
216 input processing program
230 control program
234 motion computing program
236 user program

The invention claimed is:

1. A controller for controlling a device connected thereto via a network by transmitting a computational result to the device, the controller comprising:
   a microprocessor;
   a memory configured to store a plurality of control programs and a system program; and
   a communication controller configured to operate as a communication interface with the network, the communication controller comprising a system timer configured to generate an interrupt signal to set each control cycle of the plurality of control programs,
   wherein
   the system program includes a scheduler program configured to cause the microprocessor to control a timing at which the control programs are executed according to each control cycle,
   each of the plurality of control programs includes a communication instruction configured to cause the communication controller to transmit the computational result to the device connected via the network, the microprocessor is configured to execute the plurality of control programs in parallel, and the scheduler program is configured to cause the microprocessor to generate a communication instruction that specifies in advance, based on a communication path length and an amount of data to be transmitted, respective times to cause the communication instruction included in each of the plurality of control programs to be executed in parallel such that when the specified respective times come, each of the plurality of control programs execute the respective communication instruction during a control cycle to cause the communication controller to transmit the respective computation result without colliding with a communication process performed by the communication controller, and the communication path length comprises a length of a physical path over which the computational result is transmitted.

2. The controller according to claim 1, wherein the scheduler program is further configured to:

cause the microprocessor to monitor a time measured by a timer, when a predetermined time is detected, cause the microprocessor to start executing the plurality of control programs to be executed in parallel.

3. The controller according to claim 1, wherein in accordance with the communication instruction included in each of the plurality of control programs a core of the microprocessor is configured to:

read output data associated with one of the plurality of control programs from the memory, and transfer the output data to a communication buffer of the communication controller.

4. The controller according to claim 3, wherein the core of the microprocessor is further configured to generate the communication instruction to specify the respective times at which the communication controller transmits the output data from the buffer.

5. The controller according to claim 4, wherein the communication controller is configured to transmit the output data for the one of the plurality of control programs to external devices via the network at the specified time.

6. The controller according to claim 1, wherein the communication controller is configured to:

receive input data from external devices via the network, and transmit the received input data from a communication buffer in the communication controller to a buffer included in the memory of the microprocessor, wherein the input data is copied from the buffer included in the memory of the microprocessor into a computation area of the memory for computation in accordance with an instruction provided from an input processing program.

7. The controller according to claim 6, wherein, in accordance with an instruction provided from a user program, a core of the microprocessor performs a sequence computation using the input data stored in the computation area of the memory when the transmission from the communication buffer in the communication controller to the buffer included in the memory of the microprocessor is completed.

8. The controller according to claim 7, wherein, the core of the microprocessor is configured to:

perform computation using the input data to obtain data for motion control, and transfer the computed data for motion control to a work area in the memory for a motion computing program.

9. The controller according to claim 8, wherein, in accordance with an instruction provided from the motion computing program, the core of the microprocessor is configured to:

perform computation using the motion computing program to obtain a command value for a motor corresponding to a control cycle of the one of the plurality of control programs, obtains output data, transfers the output data to a buffer area of the microprocessor, from which the output data is to be transferred to the communication controller.

10. The controller according to claim 9, wherein the core execute performing computation, obtain output data, and transfer the output data in predetermined cycles set in the control program.

11. The controller according to claim 10, wherein in accordance with an instruction provided from an output processing program included in a second one of the plurality of control programs, a second core is configured to:

read the output data associated with the second one of the plurality of control programs from the memory, and transfer the output data to the communication buffer in the communication controller.

12. The controller according to claim 11, wherein the second core is further configured to generate an instruction to specify a transmission time at which the communication controller transmits the output data associated with the second one of the plurality of control programs, and the transmission time at which the output data is transmitted from the communication controller is set to prevent the transmission of the output data associated with the second one of the plurality of control programs from colliding with communication performed in the communication controller.

13. The controller according to claim 12, wherein the transmission time is specified by calculating a time at which the communication controller completes transmission of the output data and reception of the input data.

14. The controller according to claim 13, wherein the times at which the communication controller completes transmission of the output data and reception of the input data are determined in advance based on one or more of: the communication path length; the amount of data to be transmitted; and a time taken for communication performed via the network.

* * * * *